Sept. 19, 1950  J. B. CLARK  2,522,502
FILTER

Filed July 28, 1945  2 Sheets-Sheet 1

INVENTOR
Joel B. Clark
BY Parker Prochnow & Farmer
ATTORNEYS

Sept. 19, 1950 J. B. CLARK 2,522,502
FILTER
Filed July 28, 1945 2 Sheets-Sheet 2
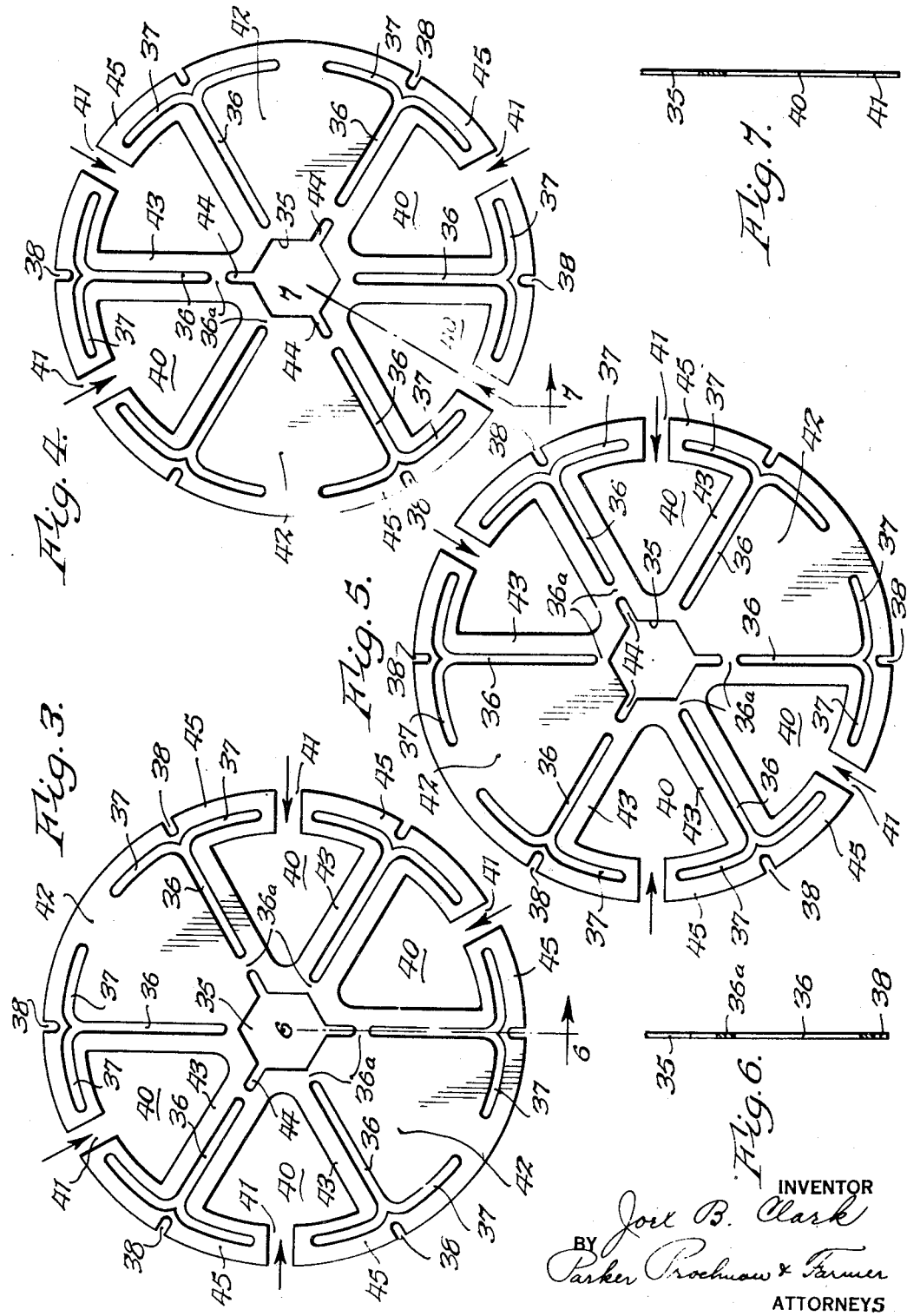
INVENTOR
Joel B. Clark
BY
Parker Prochnow & Farmer
ATTORNEYS Patented Sept. 19, 1950

2,522,502

UNITED STATES PATENT OFFICE 2,522,502

FILTER

Joel B. Clark, Canfield, Ohio, assignor to The Auto Appliance Patents Co., Youngstown, Ohio, a corporation of Ohio Application July 28, 1945, Serial No. 607,592

7 Claims. (Cl. 210—169)

This invention relates to improvements in liquid filters.

One of the objects of this invention is to provide a filter having a filtermass of improved construction and formed of a plurality of disks of filter material.

Another object is to provide disks or sheets for the filtermass which are all of the same shape and form, and which are arranged in different angular relations about their center so as to provide passages for the filtrate. Another object is to provide filter disks of improved construction which are inexpensive to produce, and which can readily be assembled to form a filter unit. A further object is to provide disks of this kind which may be cut from paper or other filter material, and which are constructed to reinforce each other so that a relatively strong filter element is produced.

Another object of this invention is to provide a filter of this type with means for varying the pressure with which the disks are pressed together, for the purpose of adapting the filtermass for use in connection with liquids of different viscosities. Another object is to provide a filter of this type with readily visible means to indicate the extent to which the filtermass is compressed, so that the filtermass can readily be adjusted for operation on liquids of different viscosities.

It is also an object of this invention to provide a filter of this kind with thermostatically controlled means for by-passing the material to be filtered when cold, and for automatically stopping the by-pass when the material becomes heated to such an extent that it can readily pass through the filtermass.

Other objects and advantages of this invention will appear from the following description and claims.

In the accompanying drawings, in which I have shown by way of example one embodiment of this invention:

Figure 1:
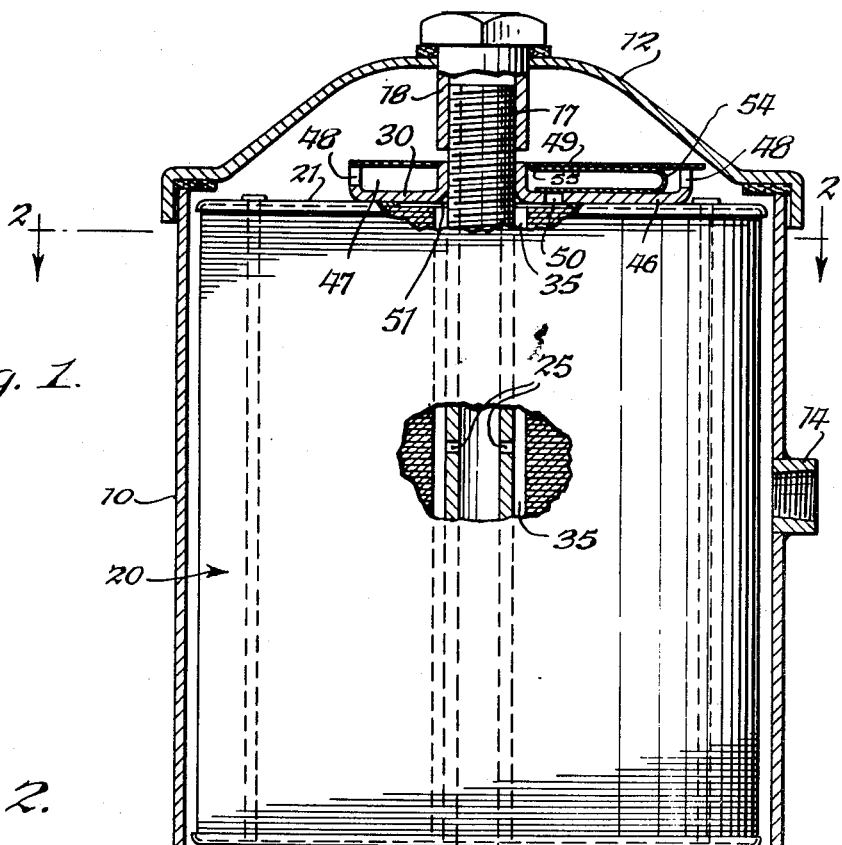
Fig. 1 is a central sectional elevation of a filter housing, showing the filter element, partly in elevation and partly in section.

Figs. 3, 4 and 5 are plan views of three of the filter disks, showing the same successively turned to different positions about their axes, and ready to be assembled one on top of the other; and Figs. 6 and 7 are fragmentary sectional views on lines 6—6, Fig. 3, and 7—7, Fig. 4.

The filter shown in the accompanying drawings is intended primarily for use in connection with internal combustion engines for filtering the crank case oil of the same substantially continuously during the operation of the engine, but it will be understood that it is intended to limit this invention to use in connection with internal combustion engines, nor with the filtration of oil, since obviously the filter may equally well be used with other fluids.

The housing of the filter may be of any suitable or desired construction, that shown including a shell having a cylindrical side wall portion 10 and a convex hollow bottom 11 preferably formed integral with the side wall 10, and 12 represents a removable lid or cover for the housing. The housing, as shown, is provided with an inlet 14 for the liquid to be filtered, and a drain plug 15 by means of which a housing may be emptied or sediment removed therefrom.

16 represents a tube centrally arranged within the housing and extending outwardly through and secured to the bottom thereof. The lower end of this tube is threaded or otherwise adapted for the connection of piping or tubes for carrying the filtrate from the housing. This tube 16 is provided at its upper end with an external thread 17, with which an internally threaded cap or nut 18 may cooperate, the cap extending through an aperture in the cover or lid 12, and having an enlarged head serving to clamp the lid on the housing. Housings of this type have heretofore been used in connection with oil filters and the housing, of itself, does not constitute any part of this invention, and the various features of this invention may be used in connection with tanks or housings of other constructions.

20 represents, in general, the filter element which comprises a stack of disks of suitable filter material, such for example as filter paper, the disks being held in place by means of upper and lower plates 21 and 22 made of relatively rigid material, such for example, as metal. The parts or disks of the filter element are held together by means of rods or pins 24 which extend through holes in the plates 21 and 22, and which also engage holes or notches in the filter disks to hold them in correct relation to each other and to the end plates 21 and 22, as will be hereinafter more fully explained. In the operation of the filter, the liquid to be filtered enters into the housing through the passage 14, and passes through or between the disks toward the middle portions thereof and the filtrate is then discharged into an open central space between the filtermass and the central tube 16, this tube being, for example, provided with apertures 25 through which the filtrate passes into the central tube 16 for discharge from the housing.

In order to prevent any of the liquid to be filtered from entering the ends of the central space between the filter disks and the central tube 16, a suitable gasket 27 is provided at the lower end of the filtermass and is held in place by means of a recessed or dished plate or retainer 28 which is urged against the lower plate 22 of the filter element by means of a spring 29. At the upper end of the filtermass the entry of liquid to be filtered into this central space 16 is prevented by means of a base 30 of a thermostat housing, which base plate has a threaded engagement with the threaded part 17 of the central tube and which bears against the upper end plate 21 and seals the upper end of the central space surrounding the discharge tube 16.

The disks comprising the filtermass are shown in detail in Figs. 3 to 7, and each disk is made of a suitable material through which liquid may pass for filtering the same, such for example as filter or porous paper, cloth or other porous material in sheet form. Each disk has a central opening 35 into which the filtrate may pass, and which openings, when the disks are assembled, form the central passage through which the central tube 16 passes, and which receives the filtrate after it has passed through the filtermass. Each disk also includes a plurality of T-shaped slots, which are cut out of the disk, each comprising a radial slot or passage 36 ending in a pair of arc-shaped slots 37 communicating with the radial slot 36. Six of these slots are shown, the radial portions of which are, consequently, spaced about 60 degrees apart, but it will be understood that any desired number of these slots may be provided. The disks are also provided with notches or holes 38 adjacent to the periphery of the disk through which the retaining pins 24 of the filtermass may extend, these holes or notches corresponding in number to the number of radial slots 36 in the disks.

Each disk is also provided with a plurality of recesses or holes 40 therein which are cut out of the disks, the sides of which recesses extend parallel to the radial slots 36 and are spaced therefrom a distance which determines the distance through which the fluid to be filtered passes from the holes or openings 40 into the radial passages 36 in a direction parallel to the opposite faces of the disks. These holes 40 are, consequently, sector shaped, and each hole is connected with the exterior of the disk by a passage 41. In the particular disks shown, four holes or recesses 40 are provided in each disk, two of the spaces between adjacent radial slots 36 being left uncut, as shown at 42. By cutting the disks in this manner, a plurality of radially extending arms 43 are formed which terminate at their outer ends in arcuate or transversely extending arms 45 and the fluid may pass through these arms into the slots 36 and 37. Two adjacent pairs of these arms are connected by the integral or uncut webs or parts 42.

The radial slots 36 are for the purpose of conducting the filtrate into the central apertures 35, and if desired, these slots could extend into the central aperture 35. This would, however, weaken the disks and make them harder to handle and to assemble, and consequently, I prefer to have the slots spaced from the central aperture by uncut portions of the material of the disks. In order to provide passages for the filtrate from the slots to the central passage, I form the radial slots 36 of different lengths. Adjacent to the inner ends of the shorter slots 36, short slots 44 extend outwardly from the central aperture 35, substantially in alinement with the short slots 36.

It will be noted that all of the three disks shown in Figs. 3 to 5 are identical. The disk shown in Fig. 4 is turned clockwise to an angle of 60 degrees from the disk shown in Fig. 3, and the disk shown in Fig. 5 is turned clockwise a further angle of 60 degrees from the disk shown in Fig. 4. In assembling the disks of the filter element, each succeeding disk is turned through an angle of 60 degrees from the preceding disk. If the filter disks were provided with a different number of radial slots 36 from those shown in the drawings, the succeeding disks would be turned through angles corresponding to the angle between two adjacent radial slots 36. It is not necessary that each succeeding disk be turned through the required angle, since two or more disks may be assembled in the stack of the filter element without turning, then two or more before the next turn is made, and so forth till the desired number of disks have been assembled. By turning the disks through the correct angle, the notches or holes 38 will all be in alinement.

When the disks are assembled in this manner, it will be noted that the material to be filtered may enter the passages 41 and pass into the cavities formed by the aligned holes or recesses 40 formed in the disk, and the material to be filtered then passes through the portions of the disks between the holes or recesses 40 and the slots 36 and 37, and also from the exterior surfaces of the disks into the slots 37, as indicated by the arrows on one T-section of the disk in the lower left side of Fig. 5. It will be obvious, therefore, that by cutting the disks so that the T-shaped arms extending outwardly from the middle portions of the disks provide an exceptionally large surface through which the fluid may pass, and consequently, the filter elements will have a long life before they become clogged. The filtered liquid finally passes from the filtermass into passages formed by the slots 37 and 36, and from the radial slots 36 and the slots 44, the filtrate passes into the central space 35 of the filter element. Despite the fact that none of the radial slots 36 extended directly into the central aperture 35, which would weaken the disk structure, these slots, when the disks are assembled, form clear passages to the central space formed by the central apertures 35.

When the disk shown in Fig. 4 is placed over the disk shown in Fig. 3, the long radial slots 36 in Fig. 4 will, at their inner ends, be in registration with the outer ends of the slots 44, so that a long radial slot of one disk establishes communication between the short radial slot and the slot 44 of an adjacent disk. Filtrate which collects in a shorter slot 36 will pass from the inner end of a shorter slot into the longer slot of an adjacent disk, and then from the longer slot into the outwardly extending slot 44. In other words, in order not to weaken the disks, each radial slot is interrupted by an integral part 36a of the web of the disk and these parts 36a of adjacent slots are spaced at different distances from the center of the disk. Consequently, when the disks are assembled into a filter element, the parts 36a are out of alignment with each other so that the filtrate may flow around these parts of the central passage. In this manner, the filter element has a large number of communicating passages from the radial slots to the central passage formed by the holes 35 of the disks. Portions of the slots 36 of all of the disks will be in alignment throughout the height of the filter mass or element, and by turning the disks during assembly, a large number of complete passages for the filtrate from the radial slots 36 into the central aperture 35 are formed. Any other means for conducting the filtrate from the slots of the arms to the central passage may be provided, and since all of the slots of the disks, when assembled into an element form a series of continuous passages extending from end to end of the element, the filtrate may be readily collected from these passages, even if no central passage is formed in the element, as would be the case if the central apertures 35 of the disks were omitted.

When the disks are assembled, one above the other, the uncut sectors 42 of each disk serve to reinforce the T-shaped portions of adjacent disks, thus assuring a strong and rigid filter element. If desired, however, all of the spaces between T-shaped slots may be cut out, as shown at 40, since the rods 44 may in some instances be sufficient to hold the T sections of the disks in alignment. These uncut portions 42 do not appreciably decrease the area exposed to the entry of fluid into the filtermass, since the fluid at opposite sides of the portions 42 will flow through the opposite surfaces of uncut portions 42 and then parallel to these surfaces to the slots 36 and 37.

In the assembly of the filtermass or element, the desired number of disks are assembled, as described, and the retaining pins 24 are positioned in the holes or notches 37, and the ends of these pins have heads or enlargements thereon, thus keeping the disks in assembled relation to the end plates 21 and 22 of each filter element. The element can then be positioned in a filter shell or cartridge while the cover is removed, by sliding the filter element over the central tube 16 approximately into the position shown in Fig. 1. The base 30 of the thermostat housing is then screwed on the threaded part 17 of the stem 16 into engagement with the filter element, and the cover may then be secured on the housing. If no thermostat is used, any other retaining plate or disk may be used to hold the filter element on the central tube 16. If a filter element becomes plugged up with material removed from the fluid being filtered, the element can be easily removed and discarded and replaced by another element.

If the filter is to be used in connection with the filtering of crank case oil of internal combustion engines, in cold weather the oil in the engine and filter may become so thick and viscous that it will not flow through the filter element until the engine has been running for a period of time sufficient to warm up the filter. It is, of course, desirable to have the filter become operative as soon as possible after starting the engine and for this purpose, I have provided a by-pass for the filter so that oil from the engine may flow through the filter housing and around the filter element, thereby greatly decreasing the time required to warm up the filter element to such an extent that it will function. Preferably, the oil is by-passed through the central portion of the filter so that warm oil entering the inlet 14 will pass around the sides of the filter element and then downwardly through the central passage in the element. I preferably also provide a thermostatically controlled by-pass so that the operation of the by-pass will be entirely automatic. Any suitable means for accomplishing this result may be employed, and in the construction illustrated, I have provided a thermostatic housing of which the base plate 30, which is used for securing the filter element in place, forms a part. This base plate is mainly circular in form, but has an outwardly extending arm 46, in the particular construction illustrated. A flange 47 extends upwardly around the edge of the base plate 30 and of the arm 46 thereof and this flange is preferably provided with a plurality of slots or openings 48 through which the oil may readily enter the thermostat housing. A cover plate 49 is secured to the flange. In the construction shown, the base 30 of the housing is provided with a by-pass aperture 50 which communicates with an opening or hole 51 in the upper plate 21 of the filter element, and this hole, in turn, communicates with the central passage in the filter element which extends about the tube 16.

A bi-metallic thermostatic element 54 is arranged within the housing. This thermostatic element may be of any suitable shape or form, and in the construction shown is of U-shape, having one end thereof extending over the by-pass 50, and having the other end thereof welded or otherwise secured to the cover plate 49 as shown at 55, Fig. 1. A portion of the thermostat extends into the arm 46 of the housing, but if desired, a thermostat of other form may be used which may not require the arm 46 of the housing. The thermostatic element is so constructed that when the liquid to be filtered is warm, the free end of the thermostatic element will cover the by-pass aperture 50, as shown in Fig. 1. When the fluid to be filtered is cold, the end of the thermostatic element which covers the by-pass aperture 50 is raised, thus uncovering the aperture, and in that case, oil or other liquid to be filtered may pass through the slots or openings 48 formed in the upwardly extending wall 47. Consequently, when the by-pass is opened, liquid entering the inlet 14 will flow around the filter element and through the openings 48 into the by-pass aperture 50, and then downwardly through the middle passage in the filter element and through the holes 25 into the pipe 16.

This flow of liquid, as the same becomes warm, will heat the filter element and the liquid in the disks of the same, so that the filter element will rapidly become warmed to such an extent that filtration will begin. As soon as the liquid becomes warm, the thermostatic element returns to the position shown in Fig. 1, so that the operation of the filter will be resumed. Any other means may be employed for by-passing liquid around the filter element, or the by-pass means may be omitted, if desired.

The filter may be regulated to operate on liquids of different viscosities by compressing the filter disks to varying extents. This may, for example, be effected by turning the thermostatic housing on its screw-threaded engagement with the tube 16 until the desired pressure is obtained. Since the retaining pins 24 extend loosely through the holes in the end plates 21 and 22, and through the notches or holes 38 in the disks, the filter disks may be compressed without interference by the retaining pins 24, the lower ends of which may move downwardly from the lower end plate 22, as shown in Fig. 1, when the disks are compressed by the base plate 30 of the thermostat housing to a greater extent than by the pins 24.

The pressure against the disks is opposed by the spring 29, so that the disks of the filter element are at all times subjected to a yielding pressure.

Figure 2:
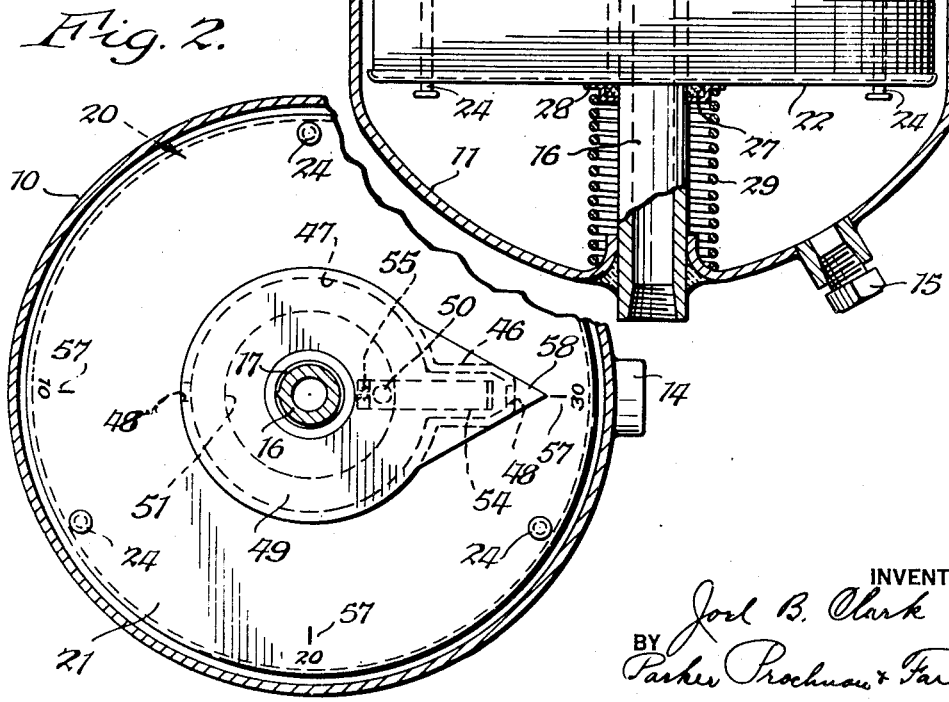
Fig. 2 is a sectional plan view thereof, on line 2—2, Fig. 1.

If desired, means of any suitable construction may be provided for indicating the extent to which the disks have been compressed, and such indicia 57 may be provided on the upper retaining plate 21, as shown in Fig. 2, and the top plate 49 of the housing 30 may be provided with a pointer 58 which may be easily moved into registration with one or the other of the indicia to compress the filter disks for use with liquids of different viscosities. By means of this construction, the filter element may be readily adjusted for operating on liquids of different viscosities, or when the filter is used on internal combustion engines, it may be adjusted to compress the disks to a greater extent during the warm weather, when the viscosity of the oil is less, and to a less extent during cold weather, when the oil is more viscous. Any other suitable means may be provided for indicating the extent to which the filter disks have been compressed. The words "filter material" as herein employed are intended to include any paper or other material which has sufficient porosity to permit the passage of warm oil or other fluid to be filtered.

I claim as my invention:

1. A filter element comprising a plurality of disks of filter material stacked face to face, each disk having an apertured central portion, the apertures of which when the disks are stacked form a central passage for the filtrate, each disk having arms extending outwardly from said central portion and each arm having a central slot cut out of the same, and arms extending transversely from said outwardly extending arms and having slots formed therein intersecting the slots of said outwardly extending arms.

2. A filter element comprising a plurality of disks of filter material stacked face to face, said disks having apertures in their central portions, said apertures when the disks are assembled forming a central passage, a plurality of arms extending outwardly from said central portion and having arc-shaped arms extending outwardly from the ends thereof, slots cut in said arms and extending toward said apertures of said disks, and means for conducting filtrate from said slots to said central portion.

3. A filter element comprising a plurality of disks of filter material stacked face to face, each disk having a plurality of T-shaped arms extending outwardly from the central portion thereof with the heads of said T-shaped arms arranged at the peripheral portion of said disk and having T-shaped slots cut therein and arranged intermediate of the width of said T-shaped arms for receiving filtrate, and means for conducting filtrate from said slots.

4. A filter element comprising a plurality of disks of filter material stacked face to face, each disk having an aperture in the central portion thereof, said apertures when said disks are assembled forming a central passage, said disk having arms extending outwardly from the central portion thereof and having the longitudinal middle portions of said arms cut out to form slots, some of said slots terminating at greater distances from said aperture than other slots, and slots extending outwardly from said aperture toward said shorter slots, said long slots when superimposed upon said shorter slots and said outwardly extending slots forming a passage connecting said radial slots with said central passage.

5. A filter element comprising a plurality of disks of filter material stacked face to face, each disk having an aperture in the central portion thereof, which apertures when the disks are stacked form a central passage, arms extending outwardly from said central portion of said disk, slots cut out of said arms intermediate of the sides thereof and forming passages for receiving the filtrate passing through the material of said arms and for conducting the same to said central passage, the slots being interrupted by integral portions of material extending across the same, said disks being stacked so that said integral portions of adjacent disks are out of alignment with each other to form passages connecting said slots with said central passage.

6. A filter including a housing having a central discharge tube for the filtrate, a filter element comprising a stack of disks of filter material arranged face to face, said stack having a central passage extending throughout the length of the same and into which said tube may extend, said tube having an opening through which filtrate from said central passage may flow into said tube, relatively rigid plates arranged at the opposite ends of said stack of filter disks, means for supporting one of said plates in said housing, a thermostatic device including a housing having a threaded engagement with said tube and engaging the other plate of said filter for varying the pressure of said disks against each other, a by-pass opening in said thermostatic device communicating with said central opening for admitting liquid to be filtered into said central opening, and a thermostatic element controlling said by-pass for closing the same when the liquid to be filtered is warm and for opening the same when the liquid is cold.

7. A filter in accordance with claim 6, characterized in that means are provided for indicating the position of said thermostatic device to indicate the pressure applied to said disks.

JOEL B. CLARK.

REFERENCES CITED

The following references are of record in the file of this patent:

UNITED STATES PATENTS

| Number | Name | Date |
|---|---|---|
| 984,705 | Rarick | Feb. 21, 1911 |
| 2,053,856 | Weidenbacker | Sept. 8, 1936 |
| 2,283,629 | Heftler | May 19, 1942 |
| 2,294,330 | Clark | Aug. 25, 1942 |
| 2,359,475 | Gauthier | Oct. 3, 1944 |

FOREIGN PATENTS

| Number | Country | Date |
|---|---|---|
| 502,103 | Great Britain | Mar. 10, 1939 |